United States Patent [19]

Cucchi et al.

[11] Patent Number: 5,228,028
[45] Date of Patent: Jul. 13, 1993

[54] SYSTEM INCLUDING PACKET STRUCTURE AND DEVICES FOR TRANSMITTING AND PROCESSING OUTPUT INFORMATION FROM A SIGNAL ENCODER

[75] Inventors: Silvio Cucchi, Gaggiano; Giorgio Parladori, Verona; Giovanna Vecchietti, S. Donato Milanese; Marco Modena, Padova, all of Italy

[73] Assignee: Telettra-Telefonia Elettronica e Radio S.p.A., Milan, Italy

[21] Appl. No.: 650,860

[22] Filed: Feb. 5, 1991

[30] Foreign Application Priority Data

Feb. 6, 1990 [IT] Italy .................................. 19265 A/90
Mar. 23, 1990 [IT] Italy .................................. 19804 A/90

[51] Int. Cl.[5] .................................................. H04J 3/24
[52] U.S. Cl. .................................... 370/94.1; 358/133; 371/31
[58] Field of Search ................... 370/94.1, 91, 109; 358/105, 141, 133; 371/31, 37.1

[56] References Cited

U.S. PATENT DOCUMENTS 4,649,541  3/1987  Lahmeyer ...................... 371/37.1
4,797,742  1/1989  Sugiyama et al. ................. 358/141
4,825,440  4/1989  Heitmann et al. ................... 371/31
4,851,906  7/1989  Koga et al. ........................ 358/136
5,043,808  8/1991  Knauer et al. ..................... 358/136

Primary Examiner—Douglas W. Olms
Assistant Examiner—Shick Hom
Attorney, Agent, or Firm—Ostrolenk, Faber, Gerb & Soffen

[57] ABSTRACT

A system for structuring information outputted at a variable bit rate from a video signal encoder and for organizing the information into information units or packets. The information packets are compatible for transmission and processing by packet transmission networks such as asynchronous transfer mode (ATM), capable of sending transmission data streams at variable speed. In a preferred embodiment, the system uses an encoder that comprises video units. Each video unit contains information classified into three distinct classes. Each video unit is associated with a video packet comprising a header and a body. Each of the three distinct classes of information associated with a video unit uses a different technique for tho providing protection of that information against transmission errors and/or information packet loss.

3 Claims, 7 Drawing Sheets

Hybrid DCT encoder

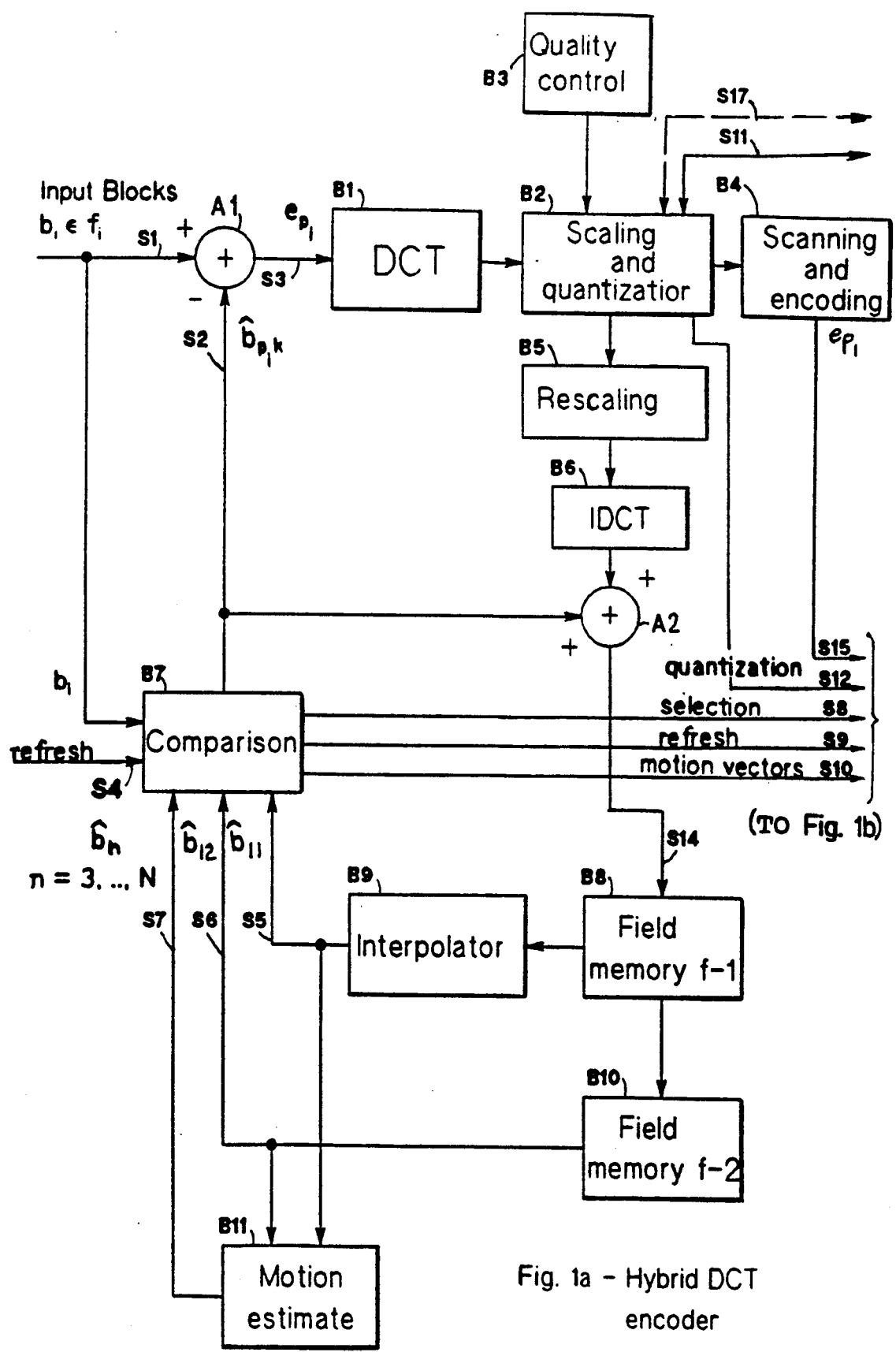
Fig. 1a – Hybrid DCT encoder

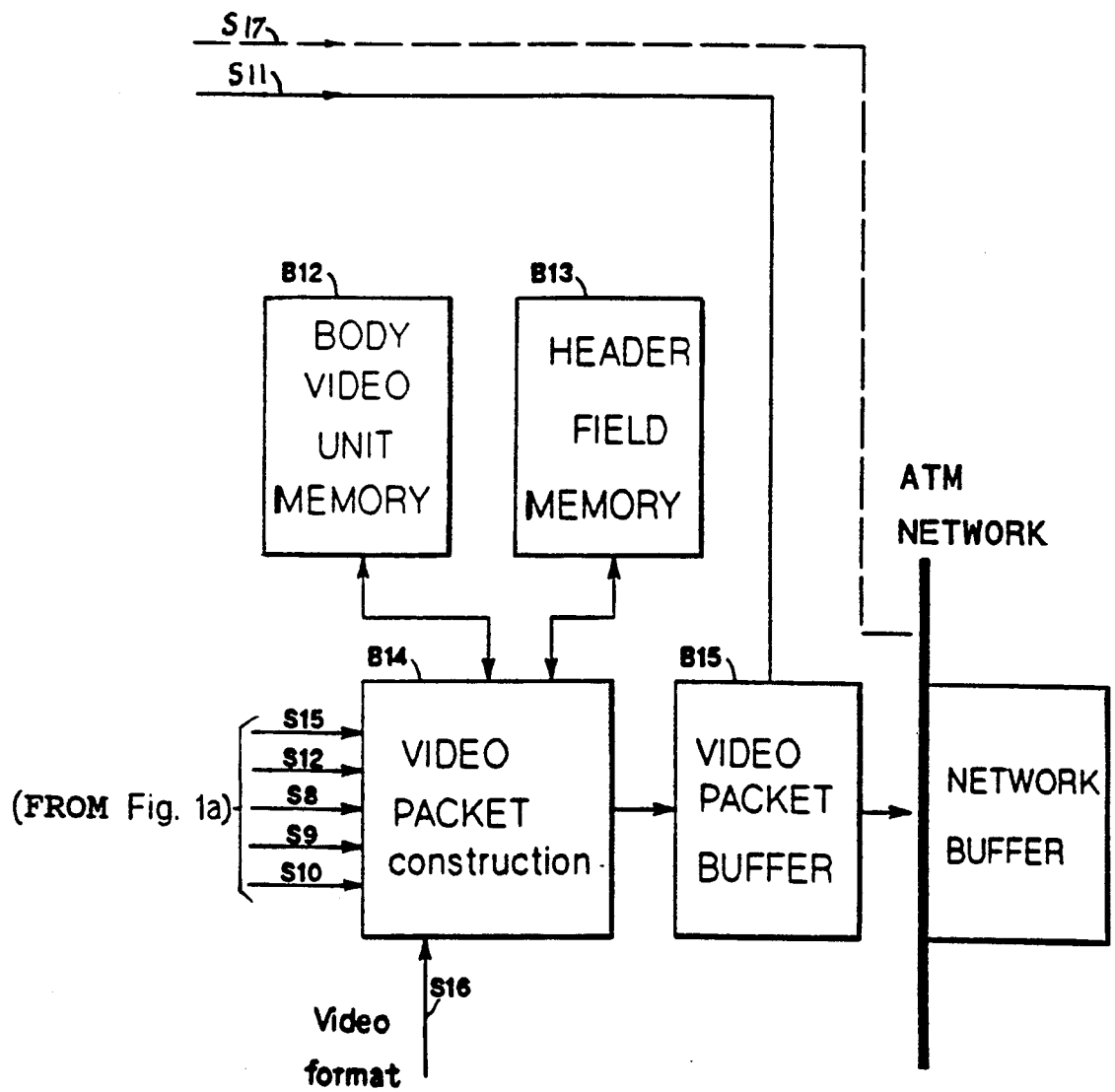
Fig. 1b – Organization and transmission of video information

| | | 0 | 1 | 2 | 3/4 | 5/6 | 7/8 | 9/11 | 12/14 | 15/17 | 18 | 19 | 20 | 21...47 |
|---|---|---|---|---|---|---|---|---|---|---|---|---|---|---|
| (E) H E A D E R | CBRH 4 cells | HAW | HAW | VUI | SC | | | | | | | | | |
| | | LQ/R | FP LQ/R | SP LQ/R | FP SC | | | | | | | | | |
| | | CQ/R | FP CQ/R | SP CQ/R | SP SC | | | | | | | | | |
| | | HNC | FP HNC | SP HNC | BNC | FP BNC | SP BNC | CRC | FP CRC | SP CRC | VF | FP VF | SP VF | VSR/ SPARE |
| | VBRH 0-16 cells | VBRH | | | | | | | | | | | | |
| | | ... | | | | | | | | | | | | |
| | | VBRH | | | | | | | | | | | | |
| (F) B O D Y | VBRB 3-543 cells | BAW | BAW | VBRB | | | | | | | | | | |
| | | VBRB | | | | | | | | | | | | |
| | | VBRB | | | | | | | | | | | | |
| | | ... | | | | | | | | | | | | |
| | | VBRB | | | | | | | | | | | | Dummy bits |

| Symbols | Meaning | Used bytes |
|---|---|---|
| CBRH | Constant Bit-Rate Header | |
| HAW | Header Alignment Words | 2 |
| VUI | Video Unit Identifier | 1 |
| (FP/SP)SC | Stripe Choice | 45 |
| (FP/SP)LQ/R | Luminance Quantization /refresh | 1 |
| (FP/SP)CQ/R | Chrominance Quantization /refresh | 1 |
| (FP/SP)HNC | Body Number Cell | 2 |
| (FP/SP)BNC | Header Number Cell (only for variable bit-rate) | 1 |
| (FP/SP)CRC | Cyclic Redundancy Check | 3 |
| (FP/SP)VF | Video Format | 1 |
| VSR | Video SYNC. Recover | 27 |
| SPARE | Available for future use | |
| VBRH | Variable Bit-Rate Header (motion vector) | |
| VBRB | Variable Bit-Rate Body | |
| BAW | Body Alignment Words | 2 |
| Dummy bits | | 0-47 |
| FP | first previous (1/2 field delay) | |
| SP | second previous (1 field delay) | |

Fig 2 - Organization of a VIDEO PACKET

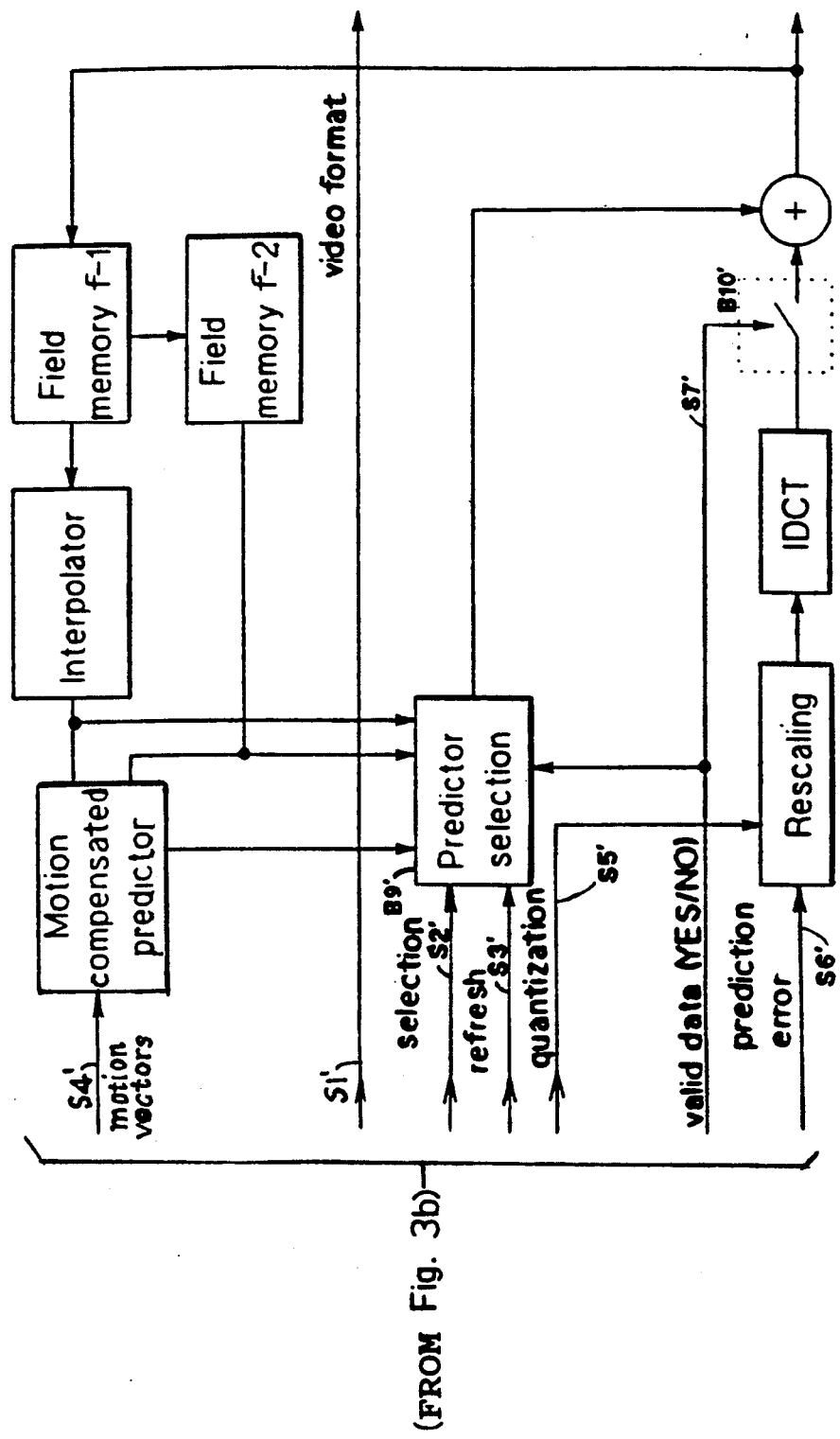

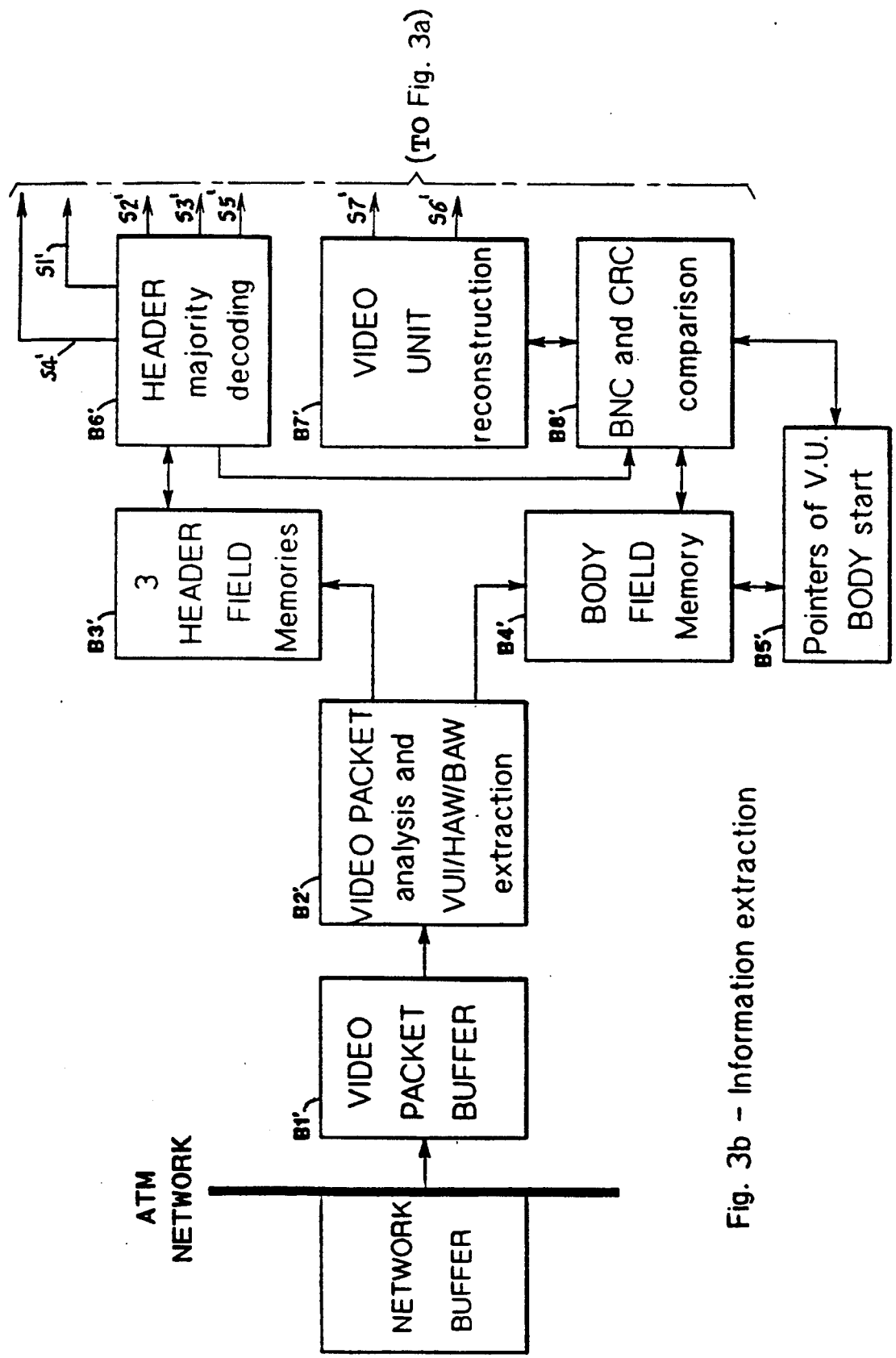
Fig. 3b – Information extraction

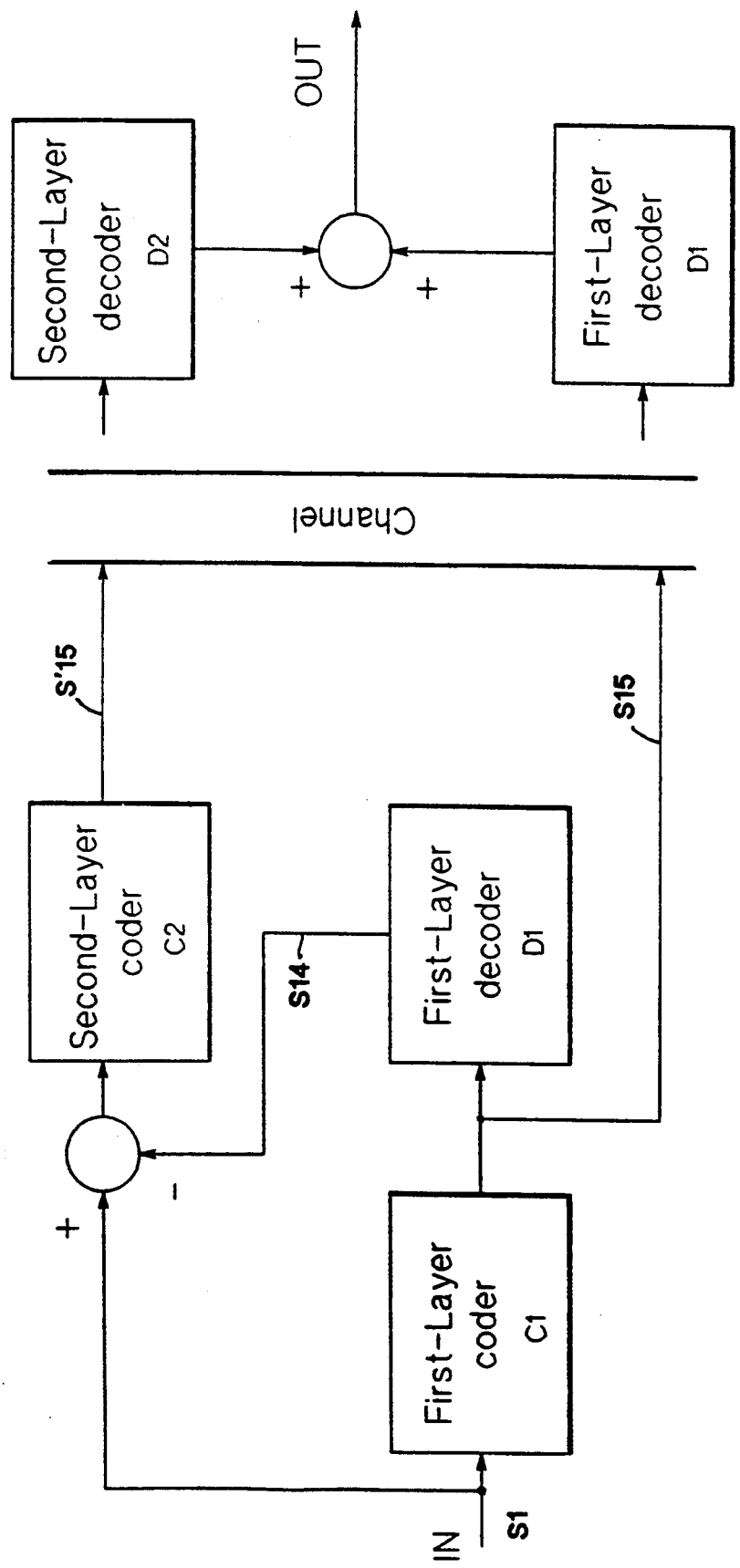
Fig 4 - Example of a recursive structure

| (E) H E A D E R | CBRH | 0 | 1 | 2 | ... |
|---|---|---|---|---|---|
| | | HAW | HAW | VUI | CBRH |
| | | ... | | | |
| | | CBRH | | | |
| | VBRH | VBRH | | | |
| | | ... | | | |
| | | VBRH | | | |
| (F) B O D Y | (F0) BODY | VBRB0 | B0AW | B0AW | VBRB0 |
| | | | ... | | |
| | | | VBRB0 | | |
| | (F1) BODY | VBRB1 | B1AW | B1AW | VBRB1 |
| | | | ... | | |
| | | | VBRB1 | | |
| | ... | | | | |
| | (FN) BODY | VBRBN | BNAW | BNAW | VBRBN |
| | | | ... | | |
| | | | VBRBN | | |

Fig 5a - Organization on a VIDEO PACKET

VIDEO PACKET 0:

| (E) HEADER | CBRH | 0 | 1 | 2 | ... |
|---|---|---|---|---|---|
| | | HAW | HAW | VUI | CBRH |
| | | ... | | | |
| | | CBRH | | | |
| | VBRH | VBRH | | | |
| | | ... | | | |
| | | VBRH | | | |
| (F0) BODY | VBRB0 | B0AW | B0AW | VBRB0 | |
| | | ... | | | |
| | | VBRB0 | | | |

VIDEO PACKET 1:

| (F1) BODY | VBRB1 | B1AW | B1AW | VUI | VBRB1 |
|---|---|---|---|---|---|
| | | ... | | | |
| | | VBRB1 | | | |
| (F2) BODY | VBRB2 | B2AW | B2AW | VBRB2 | |
| | | ... | | | |
| | | VBRB2 | | | |

VIDEO PACKET M:

| (FN) BODY | VBRBN | BNAW | BNAW | VUI | VBRBN |
|---|---|---|---|---|---|
| | | ... | | | |
| | | VBRBN | | | |

Fig 5b - Organization on M VIDEO PACKETS

SYSTEM INCLUDING PACKET STRUCTURE AND DEVICES FOR TRANSMITTING AND PROCESSING OUTPUT INFORMATION FROM A SIGNAL ENCODER

BACKGROUND OF THE INVENTION

1. Field of the Invention

The present invention relates to a system for processing information outputted at a variable bit rate from a signal encoder, and more specifically to a system in which the outputted or generated information is organized into informational units commonly referred to as cells or packets (hereinafter referred to as cells or information cells), the information cells being suitable for being transmitted and processed by new generations of transmission networks, such as Asynchronous Transfer Mode (ATM) networks. The invention also includes certain devices or modules used in the application of the system.

2. Description of the Related Art

It is well known that the encoding of video signals uses compression techniques. The compressed signals are generally transmitted over transmission networks at a substantially constant bit rate. Since the encoders generate data streams at a variable bit rate, it is therefore necessary to use buffer memories to convert the transmitted signals from a variable to a constant bit rate. The use of such buffers, however, can cause adverse variations in the quality of the signal.

Recently, transmission networks able to treat data information streams at a variable bit rate, e.g., ATM networks have been proposed. However, these networks have been characterized by a series of problems, such as the probability of losing information cells and/or delivering some of them with a wrong information content. In addition, the cells loss can greatly increase in congested information transmission situations.

SUMMARY OF THE INVENTION

An object of the present invention is the utilization of an encoder and a method, that organizes of the video information so that the whole system is optimized with regard to channel errors and cell losses caused by the transmission network, so as to provide simple and efficient management of lost and/or wrongly received information cells. Error concealment is applied on the receive side of the transmission system. The signal to noise ratio (SNR) computed at the receiving side is improved, since the better the concealment is, the greater the SNR becomes. The error concealment is implemented by localizing coded and packeted signals.

Other features and advantages of the present invention will become apparent from the following description of the invention which refers to the accompanying drawings.

BRIEF DESCRIPTION OF THE DRAWINGS

For the purpose of illustrating our invention, there is shown in the drawings a form which is presently preferred, it being understood, however, that the invention is not limited to the precise arrangements and instrumentalities shown.

FIG. 1 shows a block diagram of the encoding and video packet construction according to the invention, wherein FIG. 1a is a block diagram of a hybrid DCT encoder, and FIG. 1b is a block diagram of the organization of video information for transmission over the ATM network.

FIG. 2 presents the organizational content of a video information packet.

FIG. 3 is a block diagram showing the information extraction and decoding on the received side of an ATM network, wherein FIG. 3a is a block diagram of the decoding and error concealment portion of the ATM receiving network, and FIG. 3b is a block diagram of the information extraction portion of the received network.

FIG. 4 presents an example of an recursive structure, showing a block diagram of a two-layer encoder/decoder;

FIG. 5a presents an organization of a video information packet; and

FIG. 5b presents an organization of M video information packets.

DETAILED DESCRIPTION OF THE PREFERRED EMBODIMENT

Basic Structure of the Encoder

According to what has been said above and particularly with respect to the localization of the coded signals, the compression techniques that can be used to carry out a redundancy reduction of the video (e.g., television) signal to produce the compacted signal must guarantee a coding that is carried independently in each field in parts of the images termed as "blocks", so that the loss of some blocks does not interfere with the decoding of the remaining blocks which are received correctly. According to a first feature of the invention, therefore, the encoders used in the system are preferably selected from a group of encoders that utilize adaptive prediction schemes, such schemes typically being intrafield, interpolated interfield and interframe, with a choice of motion compensation or no motion compensation, all based on the segmentation of the image into blocks.

It is well known that a very efficient means for television signal coding is to use the interpolated interfield and the interframe types of adaptive prediction schemes. Motion compensation using "block matching" are generally added to improve efficiency.

For changes of scene or for fast motions an intrafield adaptive prediction scheme is preferably used; the intrafield coding should be imposed periodically following an operation signal "refresh" in order to avoid the accumulation of errors that are necessarily connected to the prediction scheme. In the prediction schemes, the current information is decomposed in two parts, one of which can be predicted and one of which cannot be predicted. If the prediction scheme is developed in the temporal domain, the prediction information is generally stored in a frame memory both at the transmitting and at the receiving side. The difference between the original and the predicted information is the prediction error, which is quantized, encoded and transmitted. This operation exploits the temporal correlation to send less information. The reconstructed information is obtained by adding the prediction error transmitted to the prediction information stored; obviously, the prediction error transmitted differs from the calculated one since quantization is an irreversible process.

Moreover, if channel errors corrupt the prediction error information, the reconstructed information at the receiving side differs from the information at the transmitted side, and this difference propagates itself over time.

Thus, to limit error propagation and to align the transmission and receiving systems, a refresh operation is necessary. If the error characteristics of the transmission medium were known exactly, the refresh step could be fixed a priori. For instance, four stripes step could be selected moving repeatedly from the top to the bottom of the image. Lutra frame coding generates more information since it doesn't utilize the prediction information. However, it is well known that the hybrid coding schemes combine the temporal, prediction with domain transform operations to achieve respectively a reduction in the temporal correlation as well as in the spatial correlation. It is also well known that domain transfer operations map the spatial information distributed among pixels into transformed coefficients in such a way that all of the information is gathered in the lowest coefficients. Moreover, the amplitude of all coefficients can be weighed, taking into account consideration human visual characteristics, in order that the coding efficiency clan be improved. The bi-dimensional cosine transform is normally utilized which allows use of fast algorithms that implicitly leads to segmentation of the video image into blocks.

(A) The Transmission Network

In order to better understand the problem, reference is made to the structure used in a transmission network involving a conventional hybrid encoder, such as that as has been described by S. Cucchi and F. Molo in "DCT Based Television Coding" for "DS 3 Digital Television", SMPTE, October 1988, and has been indicated in FIG. 1(a). The encoder of FIG. 1(a) is now described proceeding generally from its left to right side.

Input blocks $b_i$ belong to the field under analysis $f_i$ are inputted along line S1 into the positive terminal of adder A1. In all algorithms based on adaptive prediction schemes, a search is made of the block belonging to the preceding interpolated field; or to the preceding frame (both inputted to comparator B7 which provides the output line S2 to the negative terminal of adder A1), which gives the better prediction of the block under test. Thus, the input S2 represents the estimated block while input S1 represents the actual input block. Among the various possible selections, the one that is preferred is that which supplies a prediction error (output S3 from adder A1) equal to the distance between the input blocks at S1 and the estimated block at S2, with a minimum energy content. The comparison criteria among the various possible selections are based on energy measurements and crossed comparisons or are made with respect to thresholds Comparator B7 also receives the input block under test, for example, block $b_i$ as shown in FIG. 1(a). The possible prediction blocks are inputted to comparator B7 along lines S5, S6 and S7 coming from interpolator B9, field memory f-2, B10 and motion estimate B11, respectively. Motion estimator B11 provides an estimate of the movement for the motion compensation. The goal is the transmission of the prediction error having the minimum information content (output S3 from adder A1). This implies for a correct reconstruction on the reception side the transmission of the information around the selected predictor which is outputted from comparator B7 as "selection" along line S8.

In the case of prediction with motion compensation, the chosen motion vectors, outputted from comparator B7 along line S10 based upon the input received from motion estimated B11 along line S7 by the comparator, the chosen motion vectors are also included as output S10 with the selected predictor at S8. In addition, if signal refresh information is inputted at line S4 to comparator B7, then that information is also sent as output information at line S9 from comparator B7.

The selected prediction error at S3 is inputted to Hybrid DCT Encoder B1 where the selected prediction error is subjected to a Discrete Cosine Transform (DCT) domain transformation, with the output signal thereafter being inputted to scaling and quantization module B2 where the scaling applied at B2 weighs the psychovisual contribution of the various transformed coefficients. The computation of DCT coefficients in terms of scaling and quantization may be achieved according to the Document of CCIR Study Groups, Period 1985-1990—"Digital Transmission of Component Coded Television Signals at 30-34 Mbit/s and 45 Mbit/s using Discrete Cosine Transform"—ANNEXE 3. Vector quantization may also be foreseen.

Different types of quantizers are selected at B2 in an adaptive manner in order to guarantee a signal to noise ratio which is almost constant on the average and is decided by the input provided at B2 from quality control module B3. The quantization also depends on the state of the encoder-ATM network interface video packet buffer memory B15 as indicated by the signal presented through a feedback path S11 connected from B15 as input to Scaler and Quantizer B2. Buffer memory B15 allows a control of the generated bit rate, but with a reduction of the quality level, in order to adjust the encoder shown in FIG. 1a to conform to the statistical parameters negotiated with the ATM network during the call set-up phase. The type of quantizer that is used in B2, possibly common to many blocks, presents information that is transmitted, represented by the quantization output line S12 from module B2.

On the transmission side, and congruously on the reception side, the quantized prediction error, output line S13 from module B2, is inputted to rescaling module B5 where the prediction error is rescaled in a manner similar to the scaling performed in B2, where it is then outputted to IDCT module B6 where the scaled prediction error is antitransformed and delivered as an input to adder A2 where the signal is added to the prediction block (S2) to produce a reconstructed block output from adder A2 along line S14. Obviously, the reconstructed block at S14 differs from the original block at S1 since the quantization performed at B2 is irreversible.

The quantized prediction errors are delivered to scanner and encoder module B4 where a combination of encoding is applied to the quantized prediction error signal utilizing a combination of zeros and words with variable length. The determination of symbols to be encoded is based upon scannings of the zig-zag type or similar scannings conducted at B4. Finally, each error prediction block supplies a different information quantity, that is, a different data stream at a variable bit rate, as output from scanner and encoder B4, the ouput being indicated by line S15 in FIG. 1(a). If the motion vectors at S10 outputted from comparator B7, as discussed previously are encoded by codes with variable length words, this vector information is also generated at a variable bit rate.

Organization of the Video Information Information Classification

The purpose of the structuring of the video information, as discussed further below, is to package the blocks and the information associated with these blocks in one or more packets or cells in order to limit and locate the cells and packet lose.

The video information is organized into video units. According to another aspect of the invention, each video unit corresponds to a space location of a prefixed dimension of the television (video) image, i.e., one having a fixed number of blocks, and each video unit is divided into a variable number of cells. For a color television image, luminance and chrominance related to the same space part are generally processed in a different manner, but are transmitted as a single video unit. The transmission order of the luminance and chrominance inside the same video unit guarantees the separation of the components, without further adding information, however, it is possible to process and transmit the luminance and chrominance on different video units. The selection of the part of the television image associated to the video unit generally depends on the type of coding system that is used and includes one or more blocks in which the same image was divided.

A particularly advantageous and therefor preferred embodiment of the invention contemplates that for each video unit, the information to be transmitted is divided into the three different classes: a) normal information, b) privileged information, and c) auxiliary information.

a) normal information, or the normal class, includes the prediction errors. The information outgoing from encoder B4 for all blocks belonging to a Video Unit is inserted in consecutive cells. Since the data stream generated is made of with a variable bit rate, the number of cells differs among the Video Units. This cell number is considered information belonging to the auxiliary class (discussed in subparagraph c) below).

b) privileged information or the privileged class, includes the selections made in all the blocks belonging to a video unit, comprising the motion vectors in the case where the prediction with motion compensation is implemented together with the applied quantizer type. This kind of information can be common to all blocks forming the video unit, or it can differ among the component blocks. The privileged class also includes information common to many video units and distributed among the same video units according to a suitable assignment policy. For example, if the video unit corresponds to a stripe, the included information may be common to a field or a frame, or to many frames according to the specifications of the applicable television standard. The data stream generated by the privileged class information can be divided in part to information at a constant bit rate, typically done for the selected predictors and the type of quantizer used, and in another part, at a variable bit rate which is generally applied to the information coming from the coding with variable word length of the motion vectors. Therefore, the number of cells related to the constant bit rate can be fixed or a priori, while the number of cells related to the variable bit rate is assumed as information belonging to the auxiliary class, as discussed in the following paragraph.

c) Auxiliary information, or the auxiliary class, includes all the information that allows a simple and efficient management of the video units in terms of the detection of lost or wrongly received cells, and the subsequent error concealment. For example, the number of cells generated by the variable bit rate data streams belonging to the normal and privileged information classes form, as indicated in the respective paragraphs above, a part of the auxiliary class.

According to another feature of the invention, the remaining information depends on the protection method used for the information belonging to the various classes and on the strategy of separation for the consecutive video units.

The Video Packet

A video packet is formed by a two parts: a header and a body, which are associated with each video unit. The header and the body both differ in terms of the information classes which they each contain. Privileged and auxiliary information are contained in the header, and normal information is contained in the body. The contents of the header and body also differ according to the different methods of protection applied.

FIG. 2 indicates the structure of a video packet according to the information. In this particular case, the video packet is referred to cells having a 48 byte information field (payload) available with a direct access at an ATM layer. The header (E) precedes the body (F) in FIG. 2 in the structure of the video packet. Header (E) includes: a) an identifier, b) an alignment word, c) information of the privileged class at a constant bit rate, d) information of the privileged class at a variable bit rate, e) information of the auxiliary class equal to the cell number, f) information belonging the auxiliary class developing a protection function, g) additional information, and h) a spare part. Each item is further discussed in the similarly identified paragraphs that follow.

a) an identifier (VUI=Video Unit Identifier: e.g., 1 byte if it is assumed as an order number) provides a distinction to the video packet from subsequent video packets due to the established correspondence among video units transmitted in succession.

b) an alignment word (HAW=Header Alignment Word: e.g., 2 bytes) allows for lost identification of the start of the video packet. The contemporously use of a similar alignment word (e.g., BAW) allows to distinguish the header from the body within the same video packet.

c) the information of the privileged class at a constant bit rate (CBRH=Constant Bit Rate Header), typically the selected predictors and the type of quantizers related to the present video unit and to two other video units located in the original image at a suitable spatial distance. In a preferred embodiment, when the video unit is caused to correspond to a stripe, the three video units are taken at a distance of half field. For example, using a 4:2:2 format, images of 720×288 pixels per field and blocks of 8×8 samples, a stripe (e.g., representing the video unit) generates 90 luminance blocks and 90 chrominance blocks for the two color components. Then, for example, a byte can be associated with the selected predictions related to each block belonging to a quadblock y/cb/y/cr, corresponding to the same video part of a 16:8 pixel.

FIG. 2 indicates the information for the whole stripe (SC=Stripe Choice, here e.g., 45 byte; FPSC=First Previous SC; SPSC=Second Previous SC). Two different identifiers relative to the luminance and chrominance components are reserved for the type of quantizer and refresh, e.g., this information could be in common to a whole stripe (LQ/R=Luminance Quantization/Refresh: e.g., 1 byte, CQ/R=Chrominance Q/R; FPLQ/R=First Previous LQ/R, FPCQ/R; SPLQ/R=Second Previous LQ/R, SPCQ/R).

According to another aspect of the invention, the protection on the information of the privileged class is carried out by repetition. On the received side, the information is repeated three times and is accumulated with a delay that is correlated to the pre-set space distance, then a decision at a majority byte by byte is applied. The same procedure also applies if the delay is imposed on the transmission side.

d) The information of the privileged class at a variable bit rate (VBRH=Variable Bit Rate Header), typically the motion vectors following the same implementation of protection by repetition as described in the preceding subparagraph c). This information can be related to the considered video unit and the two other video units or it can represent a part of the information in common to many video units, and after being repeated three times, is distributed among the various video units according to a suitable policy. This method also applies if the motion vectors are coated with fixed length words, in which case the number of cells can be fixed a priori not considered as auxiliary information. Moreover, this arrangement may also be extended to information having a fixed or variable bit rate in common to many video units, typically the video standard specifications (VF=Video Format: e.g., 1 byte; FPVF=First Previous VF; SPVF=Second Previous VF).

e) the information of the auxiliary class equal to the cell number, which:
- forms the Body (F) (BNC=Body Number Cell: e.g., 2 byte; FPBNC=First Previous BNC; SPBNC=Second Previous BNC), and
- comprises the information of Header (E) at a variable bit rate, providing that it exists as indicated and discussed in the preceding subparagraph c). (HNC=Header Number Cell: e.g., 1 byte; FPHNC=First Previous HNC; SPHNC=Second Previous HNC.

The protection applies the same rule (procedure) as used in described previously in subparagraph c), as this information is associated with each Video Unit.

f) the information belonging to the auxiliary class and not indicated formally and which, according to another advantageous feature of the invention, develops a protection function into the content of Body (F). A maximum fixed number of Cyclic Redundancy Checks (CRC) protects the prediction errors that are included in the Body in order both, to allow the localization of the lost cells, and to guarantee that the received cells are exempt from errors due to the transmission channel. This feature is implemented utilizes at the same time the CRC codes, the previous BNC information belonging to the same auxiliary class and a window method. Since the Body is composed of a variety of cells, the efficiency of the CRC codes, in terms of the CRC number actually used, may be different among the video units. The CRC number depends on the locking characteristics of the system, based on recognition of the end-of-block symbols that are generated as pseudorandom sequences by suitable devices (scrambler systems). In transmission, the cells including the prediction errors related to the video unit, are scanned in succession until the necessary number of words has been accumulated so that the selected code can be recovered, or until the end of the cells of the Body. In reception, if errors are detected, then all that part of the video unit that is covered by the CRC code, which generally extends into a no integer number of cells, is deemed to be lost as though all the cells of this portion were not received. As the CRCs are related to the prediction errors of a video unit, the protection follows the same rule or procedure as described earlier in the above subparagraph c). (CRC: e.g., 3 byte; FPSRC=First Previous SRC; SPSRC - Second Previous SRC.)

g) an additional information (VSR=Video Sync Recover, e.g., 3 byte) that allows for the recover on the reception side of the video synchronism.

h) a residual part (SPARE) for further specifications and/or the case where the information field size of the cell is less than one initially foreseen.

The body (F) follows the header (E) in the structure of the video packet (FIG. 2), and includes a') an alignment word (BAW=Body Alignment Word): e.g., 2 byte) as already discussed in the above subparagraph b).

b') the prediction errors related to the blocks forming the video unit inserting on consecutive cells, as they are supplied by the encoder. The cell number depends on the selected quantizer and, in any case, it changes among the various video packets (VBRB=Variable Bit Rate Body) The last cell is generally filled with dummy bits in order to avoid the propagation of a video unit towards contiguous video packets.

FIG. 1b shows the construction of a video packet in accordance with the above-mentioned specification. The figure is examined from the left to the right side.

Module B14 entitled Process for Video Packet Construction comprises a processor (B14) that receives the input S8, S9, S10, S12 and S16 related to the privileged information and receives input S15 related to the normal information, and adds to this information the auxiliary information generated internally in order to obtain the prefixed Video Packet format.

The protection method used also requires a video packet memory, contained in Video Packet Constructor B14, to build the whole information associated with a video unit, e.g., a stripe and a header field memory (module B13) for the information included in the Header, and a Body Video Unit Memory (module B12) for the information included in the Body. The Video Packet Constructor B14, accumulates, in the body unit memory of B12, the prediction errors of an entire Video Unit, carries out the calculation of CRC codes, and generates the header of the video packet related to the video unit under test, using the content of Header Field Memory B13. That content of the header field memory, corresponds to the privileged and the auxiliary information of two other video units located at a spatial distance, respectively of a half field and of a whole field. To carry out the repetition of the above-described process, the privileged and auxiliary informations of the considered video unit are stored in Header Field Memory B13 in the corresponding locations.

The cells forming a video packet are delivered to the ATM network through a video packet buffer memory B15 following a suitable strategy. As stated above, the presence of buffer memory B15 allows an adjustment of the bit rate generated by the encoder shown in FIG. 1a in order to conform to the statistical parameter negotiated with the network during the call set-up phase (feedback signal delivered as output from B15 along line S11 as input to scaler and quantizer B2). This adjustment may be forced by the presence of a congestion signal coming from the network to the encoder (as indicated by dotted line S17 in FIGS. 1a and 1b) if this signal is foreseen.

Error Concealment

According to another aspect of the invention, the error concealment is based on the assumption of replacing, upon reception of the signal, the reconstructed block with the prediction block, if the prediction error is not received or if it is deemed to be wrong. The video packets received at the receiving side and distributed over variable numbers of ATM cells include prediction errors in the body and auxiliary and privileged information in the header. The CRC codes and the Body Number of Cells (BNC) information allow one to protect the body content employing a window method. If a cell loss happened, it would be possible to identify where the cell loss had occurred, while in the absence of a loss, the protection follows the ordinary rule to recover channel errors and to correct or deem wrong the received body content. The prediction block selected in transmission and belonging to the previous interpolated field or to the previous frame in the position given by the motion vectors is the block that best estimates the block of the test or, equivalently that which supplies a prediction error with a minimum energy content.

In case of an unforced intrafield selection that is not coming from the refresh signal (input line S9), the prediction block does not exist because the prediction error coincides with the block on the test. Therefore, it assumes to take from the frame memory on the reception side the nearest homologous block that belongs to the preceding interpolated field. However, it can also take the block that is in the same spatial location but belongs to the preceding frame. Unforced intrafield selection is preferable for changes of scenes of fast motions. In the first case, a gray level block could be taken instead of the homologous block in the previous interpolated field or previous frame. On the other hand, in the case of fast motion, visual perception seems to prefer an incorrect information, rather than nothing at all. In addition, fast motion can be restricted to a limited number of blocks, while cell loss generally comprises more near blocks for which intraframe prediction could not have been selected. Here the incorrect information helps at least to save the block edges of the image.

In case of a forced intrafield selection, that is coming from the refresh input signal (S9), if the selected predictors used in the absence of the refresh signal always transmitted together with the information of the refresh signal (1 bit for each block or less, as generally the refresh is forced on image parts), it is possible to drop down into the general procedure of replacement with the prediction block that supplies the best estimate. This concealment method requires that the selections, together with the motion vectors in the case of prediction with motion compensation, are received correctly for each block belonging to a Video Unit. This correction in reception is guaranteed by the repetition of this information for three times, and by the majority decision. The error characteristics of the ATM network, i.e. high probability of burst errors, are such that the interleaving of the auxiliary and privileged information statistically guarantees two repetitions received uncorrupted.

The Reception Network

As in transmission, we now refer to the structure on the reception side of a hybrid encoder with error concealment that uses the format of the established video packet, as presented by the block diagram of FIG. 3b. FIG. 3 is analyzed from its left to right side in the following paragraph:

1c) Receiving video packet buffer B1' receives and collections the cells, intended as the only information field delivered to the ATM network 2c) the cells are delivered from receiving buffer B1' to an video packet analysis and extraction unit B2'. The analysis made by Unit B2' on the alignment words (HAW and BAW) and on the identifier of the video unit (VUI), both included in an univocal manner into the video packets, allows to distinguish the contiguous packets, and also to distinguish the header and body inside the same packets. The video packets received and identified are stored in different locations, respectively for the header and for the body. For example, if the video unit corresponds to a stripe, the repetition of the privileged information and the auxiliary information in the header of three different packets interlaced on the distance of a field, requires at least a local memory and a field memory associated with the header. If, for example, analysis and extraction unit B2' is charged with the task of distinguishing the privileged and auxiliary information related to the three video units included in the Header of the video packet under test, it is possible to make the comparison operations easier. In fact, this classified information may be stored in three field memories, by means of a three header field memories B3', each memory therein representing one of the three repetitions, in the locations corresponding to the associated video units.

On the contrary, the prediction errors included in the body are accumulated in a body field memory B4' of at least one field. The circularly management of memory B4' is performed by means of a tables of pointers B5' associated with the video units to make possible the distinction among the body belonging to contiguous video packets.

The loss of cells comprising the alignment words (HAW and BAW) for the identifiers of the video unit (VU) allows a delayed identification and an incomplete storage of the video packet.

3c) By means of a header majority decoding module B6', the privileged and the auxiliary information associated with a video unit is obtained after a delay at least equal to the storage of the three repetitions distributed into the Headers of the video packets, by using a majority decision byte by byte on the above-mentioned information content, repeated for three times.

For example, using a video unit equal to a stripe and a delay of a field, it is possible for each identified video unit to obtain the checked privileged and auxiliary information of the video unit located in the homologue position of the received unit, but at a distance of a field, using a structure with three memories as indicated and described in the preceding subparagraph 2c). If the privileged and the auxiliary information of the received video unit is locally stored in the video packet analysis and extraction module B2', the majority decision is carried out using the contents of the three memories in the location of the Video Unit under test equal to the received one. Subsequently, the content of the local memory is unloaded into the same location of the three header field memories module B3', representing the first repetition, in order to allow for the repetition possibility of the operations.

It is well noted that the delay necessary to accumulate the three repetitions is here placed in the reception network, and the operations according to the block diagram shown in 1a and 3b are based on this assumption. However, it is possible to move this delay towards the transmission side with some minor modification of the devices or modules previously described. In that case, for example, it is advisable to exchange the memories related to the body between the transmission and receiving sides.

Header majority decoder B6' performs a comparison that provides the privileged and the auxiliary information for the video unit under test. Information included in the header (VBRH) related to the cell number at a variable bit rate (HNC) allows a verification of whether the quantity of arrived cells is exact and to take, a posteriori the majority decision that therefore, is initially applied only to the constant bit rate part (CBRH). The information rated to the cell number of the body (BNC) allows the BNC and CRC comparison unit B8' that receives the outputs of body field memory B4' and the table of pointers B5', to establish if the received cell quantity is correct. Moreover, the same device can localize the last cells and recognize if the received cells are wrong by use of the extracted CRC codes, the BNC and a suitable window method.

In case of detected errors, the whole part of the body covered by the CRC code is rejected and is generally extended into a NO integer number of cells.

4c) the unpacking of video packet is followed by its respective video unit reconstruction, in terms of the prediction errors outputted at line S6' from the video unit reconstruction module B7' and the information associated with the video unit.

Header majority decoder B6' provides the privileged information, such as the selected predictors outputted along selection line S2', the motion vectors outputted at line S4' in the case of prediction with motion compensation, the quantization step size is indicated by quantization output line S5', the refresh output at line S3' and the video format outputted at line S1'. Video unit reconstruction module B7' restores the normal information format supplying a signal of valid or invalid data, as indicated by output line S7' from module B7', respectively in conjunction with corrected or lost prediction errors outputted at line S6' from module B7', where lost errors mean errors not received or wrong ones.

The decoding scheme with error concealment is presented by the block diagram of FIG. 3a, which is described as follows:

1d) in the case of valid data, i.e., exact prediction error, the scheme follows the usual structure of a hybrid decoder, in accordance with what has been previously described in the earlier subparagraph 4a).

2d) in the case of invalid data, the prediction error is not added to the prediction block (switch module B10') and therefore the reconstructed block is exactly the same as the prediction block. Moreover, the search performed by predictor selector B9' of the prediction block which received the data valid information by output line S6' from module B7'is different from the usual structure as described earlier in subparagraph 1d) for the intrafield selection. As has already been pointed out, in case a refresh signal equal to a forced intrafield signal, the prediction block corresponding to the best selection is supplied. However, in the case of an intrafield signal coming from the selection, the prediction block supplied is the one nearest homologous block. As there does not exist a dialogue between the receiving and the transmitting side, this error concealment diversifies the image reconstruction of the transmitter with respect to the receiver. This fact imposes even more for the use of the refresh signal (or data rate) in order to guarantee the identity of operation between the transmission and reception systems. In any case, the refresh rate depends on the probability of cell lose that characteristics the network.

Progressive Coding and Priority Networks

As a further feature of the invention, it is shown that a generalization both of the video packet and of the structure related to the formation of the video information in transmission and to the extraction of the same information in reception, allows advantageously for the use of the so-called progressive encoders. As is well known, progressive encoders allow the transmission of images using following refinements, namely that it must be emphasized that the information related to enhancement of the signal is independent from the information that guarantees a prefixed quality of the reconstructed signal. Such progressive encoding is implicit in the sub Band method as has been described, for example, by D. Karlsson in the article, "Sub Band Coding of Video for Packet Networks", *Optical Eng.*, July 1988. On the other hand, in case the casine bi-dimensional transformers applied to the image segmented in blocks, for example, as has been described by Lager and M. Yamazaki in the publication "Still Picture Compression Algorithms Evaluating for International Standardization", Globecom, 1988 the progressive update can be achieved through different mechanisms as the following describes.

1e) spectral selection: for each block, the low frequency terms provide a row version of the image, which is subsequently refined by sending more and more high frequency coefficients to arrive at the final image.

2e) hierarchical or pyramidal decomposition: the whole image is initially filtered and subsampled, and therefore is encoded by Adaptive DCT (ADCT); and 3e) recursive structure: the difference between the original image and the decoded image coming from the encoding of a lower level is recursively coded. In order to describe and simplify the problem, reference is made to the conventional structure of a recursive encoder, for example, one with two levels, as indicated in FIG. 4. See also, Ghambari, "Two layer coating of video signals for VBR networks", IEEE Journal on selected areas in communications, July 1989.

The block diagram of a two-layer coder/decoder as shown in FIG. 4 is examined in the following paragraphs, preceding generally from its left to right side.

1f) First-layer coder C1 and first-layer decoder D1 can represent, e.g., respectively the hybrid DCT encoder B1 of FIG. 1a with the same input signals S1 (original block), S14 (reconstructed block), S15 (transmitted prediction error) and the decoder of FIG. 3a. The information of normal class transmitted and received at this level corresponds to the prediction errors.

Other coding and decoding systems belonging to the same group as the one used by way of example can represent the blocks C1 and D1 of FIG. 4. Moreover, they can supply data streams, typically the prediction errors, with a constant speed.

2f) Second-layer encoder C2 and second-layer decoder D2 can be implemented, e.g., either using a simple pulse code modulation (PCM coding) possibly with threshold, by the transmission of only the values higher than a prefixed threshold, or by applying a spatial or temporal differential PCM (DPCM) or a domain transformation.

The outgoing data stream S'15 from Second-Layer Encoder C2 is generally generated at variable bit rate equal to a reconstruction error and again, it can be classified as information of a normal class, but with a lower level than the output S15 from First Layer Coder C1.

Referring to the structure of the video packet as previously described, the normal class is redefined as the class which includes the prediction errors outputted at S15 and the reconstruction errors outputted at lines S'15.

Generally speaking, and with reference to a generical progressive coding, this class (using the symbol a) for normal class information) includes the normal information A0), A1), . . . , AN), i.e., the normal information class A is stratified on the level of numbers N+1 outgoing from the progressive encoder.

Consequently, the body (represented as body (F)) is divided into subsections F0), F1), . . . , FN), each having the same characteristics as indicated at point F)a')b') of the previous description.

Then, in the structure of the video packet, the header is followed by the body divided by N+1 body F0), F1) . . . FN), each one including:

a'') an alignment word (BiAW=Body ith Level A W); and b'') the information of normal class A$_i$), equal to the errors related to the encoder of the ith level; e.g., in the case of a recursive structure, the prediction errors for the level 0 and the reconstruction errors for the level 1.

In addition, the last cell is filled with dummy bits in order to avoid inside the same video unit the propagation of the ith body on the following body and the propagation of the Video Unit onto the contiguous Video Packet.

Now the Header includes the information of the auxiliary class equal to the number of cells making the ith bodies (BiNC=Body i Level Number Cell), as previously indicated at point Ee). Obviously, if the information of the normal class of a certain ith level has a constant bit rate, the corresponding cell number can be fixed a priori.

The protection follows the same procedure applied at point E)e) (BiNC; FPBiNC=first previous BiNC; SPBiNV=second previous BiNC) for the information of the auxiliary class. On the contrary, the protection of the contents of the Body, according to what has previously been pointed out in E)f), can be diversified in the different bodies F0), F1) . . . Fn), both for the presence or the lack of CRC codes, their type and the number and repetition (CRCi=cyclic redundancy check i level; FPRCRCi=first previous CRCi; SPCRCi=second previous CRCi).

The structure related to the organization of the video information in transmission, and to the extraction of the same information in reception, as proposed when the stratification is not used and as shown respectively in FIGS. 1b and 3b, can be easily extended for being adapted to the treatment of information stratified in more levels.

In the case of a recursive structure, the refinement of the ith level is possible only if the enhancement of the previous level (i-ith) was successful, that is, the use of the body Fi) involves the correct reception of the body Fi−1) belonging to previous level.

According to that previously described with respect to the concealment technique, the error concealment is applied only if some cells belonging to the body F0 are lost or deemed wrong using the protection method already pointed out. The following bodies Fi) are specifically employed to improve the image of the previous level and they can be used only if they correctly arrived and if the information of the previous level was considered valid.

As a further feature of the extension, it is worth noting that for transmission on packet networks, the stratification of the video information implies the generation of cell groups with a different priority and, therefore, the possibility of exploiting advantageously new generations of packet transmission networks, e.g., ATM networks, with priority.

In the extension of the video packet structure as proposed, the bodies Fi), with increasing index i, characterize information units (and therefore cell groups) in which they are packed with a gradually decreasing priority.

Obviously, the greatest priority belongs to the cells of the header including the privileged information and the auxiliary information of the present video unit and of the two other video units located in the original image at a suitable space distance. If the priority of the network carries out only a privileged information treatment in terms of cell loss probability, then all cells of the video packet follow the same virtual path and they are orderly delivered to the receive site with a cell loss probability that increases with the ith order of the body Fi), according to the decreasing priority.

FIG. 5a refers to the case of a single Video Packet including a single header (E) and a body (F) now divided according to its distinctive feature in N+1 BODIES F0), F1) . . . FN), equal to the number of stratified levels outgoing from the progressive coding. On the contrary, FIG. 5b refers to the case in which the priority implies a cell counting on different virtual channels according to the required priority level. Then the video packet P.V., can be divided into a number (M+1) of video packets P.V.0., P.V.1, . . . P.V.M., with M+1 being minor or equal to the number N+1 levels outgoing from the progressive encoder, so that many bodies Fi) can be grouped in a single video packet P.V.k, see, e.g., P.V. 1 including the bodies F1) and F2).

Then each video unit is associated with a video packet, subdivided into )M+1) parts. Among these packets, the video packet 0 includes at least the header E( and the Body F0), that is all information essential for the basic reconstruction of the video signal. In fact, similar to the case of a single video packet, the header E) includes the information of privileged class and auxiliary class common (e.g., VF, FPVF, SPVF) and specific for each level outgoing from the progressive encoder (e.g., BiNC, FPBiNC, SPBiNC), for each of the three video units. On the other hand, the body F0) includes the information of normal class A0), that guarantees a prefixed reproduction quality.

It is worth noting that for the used error concealment technique, the information included in the Header E) is the most important one, so it may be reserved for a better treatment to the header E) than to the body F0). Obviously, this consideration may be extended to the previous coding without stratification.

If the network does not provide an ordered delivery of the information coming from the virtual channels the receiver structure must be further revised to allow for the combination of various information data streams included in different Video Packets. Then the generic video packet P.V.k comprising one or more bodies Fi), must be provided with an identifier of video unit (VUI), in addition to the BiAWs already present, in order to make possible the recognition of the video unit to which the video packet belongs. For example, in the case of a recursive structure with two levels, a video packet subdivided into two stratified packets is associated with each video unit. The video packet 0 includes the header E) and the body F0), i.e., the prediction errors, and the video packet 1 includes the body F1), i.e., the reconstruction errors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A system for structuring information outputted at a variable speed from a video signal encoder and for organizing said information into information units comprising information packets suitable for being transmitted and processed by packet transmission networks able to send transmission data streams at a variable speed, wherein spatial locations of a video image are defined as video units, and the information output from the encoder related to said video units is classified as either normal or privileged and auxiliary information, said system comprising:

means for forming a video packet comprising a header and a body associated with each of said video units, wherein each header includes the privileged and auxiliary information of the associated video unit and privileged and auxiliary information of at least two other video units located a suitable spatial distance away, and each body comprises normal information related to the video unit associated with said video packet;

means for extracting the information in the header a plurality of times and using the extracted information to determine the accuracy of said information in the body; and means for implementing error concealment by replacing the information in the body with predicted information if the information in the body is determined to be inaccurate.

2. A system according to claim 1, wherein the encoder is a conventional hybrid discrete cosine transform (DCT) encoder.

3. A system in accordance with claim 1, comprising:
   on a transmission side:
      a video packet constructor for receiving the information output from said encoder, said video packet constructor operating in conjunction with a body video unit memory and a header field memory to form said video packets; and
      a memory for storing video packets;
   and on a reception side:
      a receiving buffer memory for receiving video packets transmitted by said reception side;
      analysis and extraction means for receiving data from said receiving buffer memory and for extracting parameters from said transmitted data to distinguish contiguous video packets, and to distinguish from the video packet information related to said video packet header and said video packet body;
      a header field memory and a body field memory coupled to said analysis and extraction means for storing information related to said header and said body, respectively;
      means for applying a majority decoding rule to the information stored in said header field memory;
      means for applying error correction codes to the information stored in the body field memory;
      means for reconstructing a transmitted video unit; and
      means for applying error concealment to said reconstructed video units.

* * * * *